(No Model.)
F. W. SMITH.
PENDENT HANDLE.
No. 443,013. Patented Dec. 16, 1890.
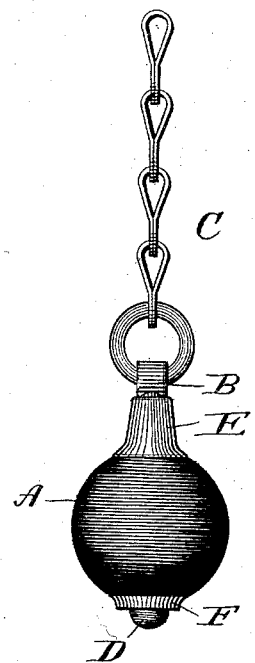
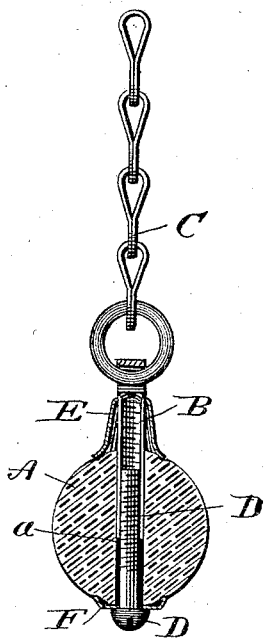
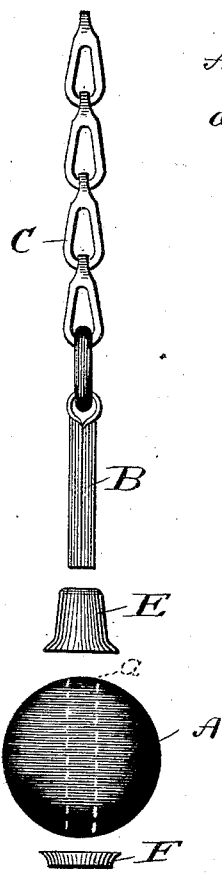
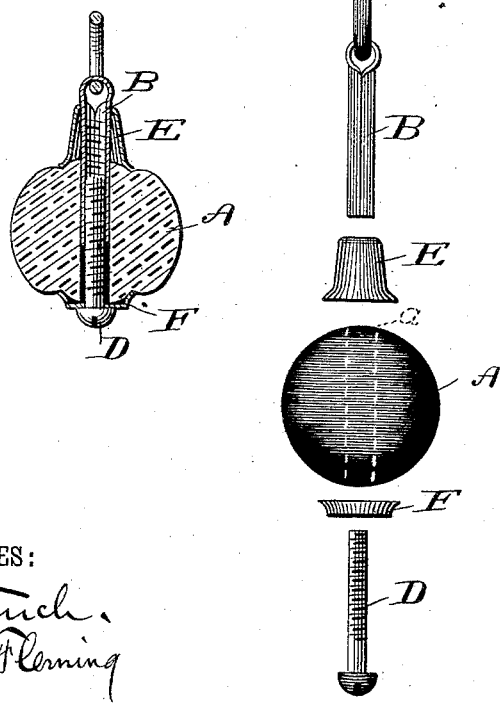
WITNESSES:
J. French.
Chas H. Fleming
INVENTOR
Friend W. Smith
BY
F. W. Smith Jr.
ATTORNEY

UNITED STATES PATENT OFFICE.

FRIEND W. SMITH, OF BRIDGEPORT, CONNECTICUT, ASSIGNOR TO THE SMITH & EGGE MANUFACTURING COMPANY, OF SAME PLACE.

PENDENT HANDLE.

SPECIFICATION forming part of Letters Patent No. 443,013, dated December 16, 1890.

Application filed September 15, 1890. Serial No. 365,058. (No model.)

*To all whom it may concern:*

Be it known that I, FRIEND W. SMITH, a citizen of the United States, residing at Bridgeport, in the county of Fairfield and State of Connecticut, have invented certain new and useful Improvements in Pendent Handles; and I do hereby declare the following to be a full, clear, and exact description of the invention, such as will enable others skilled in the art to which it appertains to make and use the same.

My invention relates to handles, but more particularly refers to pendent handles, such as are commonly suspended by a chain and used in connection with a valve, whereby the latter may be conveniently opened.

The object of my invention is to provide an economical handle which shall have a neat appearance and which shall by virtue of its structure be incapable of marring any woodwork, wall, or other object against which the handle may swing.

In the accompanying drawings, Figure 1 is an elevation of my improved handle; Fig. 2, a sectional elevation; Fig. 3, an elevation showing the several parts of my improvement disconnected and in proper relative position preparatory to assembling; Fig. 4, a sectional elevation taken at right angles to that shown at Fig. 2, but showing particularly the displacement of the substance of the rubber by the action of the clamping-caps.

Similar letters denote like parts in the several figures of the drawings.

Prior to my invention handles of this description have been constructed with a wooden body, around which latter has been secured a rubber ring to act as a fender when the handle swings against the wall or wood-work; also, these handles have been made from two wooden sections with a disk of rubber between them, said sections and rubber being clamped together by a screw-bolt and nuts. It is well known that in cases where the rubber ring is sprung around the wooden body said ring is frequently forced off by pulling on the handle; also, a rubber band secured around a wooden body by metal straps will in a short time become loosened and useless, owing to constant usage and the effects of perspiration from the hand. The handles in which a rubber disk is clamped between two wooden sections will not stand much usage, because the nuts will back and the parts thereby become loosened in a short time. In order to prevent such loosening of the parts, it is essential that the devices which clamp the rubber with a screw action should normally distort the shape of the rubber, so that the latter will exert a constant resistance to the clamps. This resistance will not be afforded by a flat rubber disk, but is abundantly furnished by a spherical rubber body. My improved handle is not open to these objections, and while it consists, essentially, of a spherical rubber body clamped between end pieces there are certain peculiarities which identify the construction of my handle as a whole which are not common to any other handle, and which will be hereinafter specifically pointed out.

A is a spherical body made of rubber and having extending therethrough a perforation $a$.

B is an elongated nut adapted for attachment to a chain C.

D is a screw of such a diameter as to be readily inserted through the perforation $a$ and driven within said nut.

E F are caps at opposite sides of the body A and between which the rubber body is clamped by the action of the screw and nut.

The elongated nut passes through the rubber body, the screw being driven within said nut to bring the clamping-caps E F firmly against the body. Said caps not only clamp the rubber body, but they present a neat finish, and when made of metal and nickel-plated they afford a very pleasing contrast with the dark rubber.

The all-important feature of my invention resides in the fact that the rubber body not only acts as a fender, but by its resilient yielding to the action of the clamping-caps it prevents any disarrangement or loosening of parts. In other words, if the body were made of any material other than rubber, or if it were made from a plain flat disk of rubber, the actual usage of the device would cause the screw to back and the parts would become loose, whereas in my improvement when the screw is driven within the nut to clamp the spherical rubber body the substance of the latter will, owing to its spherical shape, yield and become displaced by the caps, but will by its resiliency exert a constant resistance against said caps, which resistance is abundantly sufficient to counteract any tendency of the screw to back.

The spherical rubber body has a more efficient action than a wooden body, or a rubber ring around a wooden body, or a plain flat disk of rubber clamped between two wooden sections by a bolt and nuts, because it will not work loose and become detached, like a ring, will not mar wood-work, like a wooden handle, and the clamping members will not become loosened by usage, as in the instance of the plain flat rubber disk.

In Fig. 4 I have shown particularly the displacement of the substance of the rubber by the action of the clamping-caps, and I will add in this connection that by using rubber of a sufficient yielding quality the general design of the handle may be greatly varied by simply forcing the clamping-caps closer together.

It is immaterial how the caps are made and what they are made of, and at Fig. 5 I have shown a construction in which said caps may be, and in fact are, made of wood, the rubber body being of a normally-flat shape on the top and bottom. It is a significant fact that the construction shown at Fig. 5 may be effected by tightly compressing a normally-spherical rubber body between the clamping-caps shown in said figure, it being of course understood that the nature of the rubber is such that it will readily yield to the action of the caps.

Having thus described my invention, what I claim as new, and desire to secure by Letters Patent, is—

1. In a pendent handle, the combination of a spherical rubber body having a perforation therethrough, the metallic caps at the top and bottom of said body, and the screw and elongated nut extending through said caps and within said body and adapted to engage with each other to secure the parts of the handle, said nut having formed therewith an eye for attachment to a chain, substantially as set forth.

2. A pendent handle comprising a spherical rubber body, perforated as shown, caps at the top and bottom thereof, and a nut and screw extending through said caps within the perforated body, said caps being forced by the action of the nut and screw against the body, whereby the latter is normally depressed at the top and bottom, substantially as set forth.

3. The combination of the rubber body having perforation therethrough, nut B, adapted for attachment to a chain, screw D, extending through said body and engaging with the nut, and caps E F, respectively above and below said body and adapted to be operated by said screw and nut to clamp the rubber body firmly, substantially as shown and described.

In testimony whereof I affix my signature in presence of two witnesses.

FRIEND W. SMITH.

Witnesses:
F. W. SMITH, Jr.,
J. S. FINCH.